United States Patent [19]

Simmonds et al.

[11] 3,802,783
[45] Apr. 9, 1974

[54] COLOR SHADE ANALYZER
[76] Inventors: James F. Simmonds, R.R. No. 1, Box 81 A, Daleville, Ind. 47334; David S. Dennis, 834 Old Orchard Rd., Anderson, Ind. 46001
[22] Filed: Feb. 22, 1972
[21] Appl. No.: 228,172

[52] U.S. Cl................ 356/195, 356/188, 356/173, 356/98
[51] Int. Cl.............................................. G01j 3/46
[58] Field of Search ........... 356/173, 178, 188, 195, 356/201, 98, 100

[56] References Cited
UNITED STATES PATENTS

| | | | |
|---|---|---|---|
| 2,517,121 | 8/1950 | Liston | 356/96 |
| 3,123,660 | 3/1964 | Matthews | 356/100 |
| 2,768,306 | 10/1956 | Grubb et al. | 356/100 |
| 3,633,012 | 1/1972 | Wilhelmson | 356/201 X |
| 3,512,894 | 5/1970 | Wood | 356/195 |
| 3,421,821 | 1/1969 | Alessi | 356/195 X |

OTHER PUBLICATIONS
"Trial Mpr. of Photoelectric Colorimeter Using Optical Fibers," by Ishikawa et al., Bltn. Tokyo Dental Coll., Vol. 10, No. 4, pp. 191–197, Nov. 1969

Primary Examiner—Ronald L. Wibert
Assistant Examiner—Paul K. Godwin
Attorney, Agent, or Firm—Trask, Jenkins & Hanley

[57] ABSTRACT

A color shade analyzer for use in comparing and matching the color and shading of a dental prosthesis to that of a natural tooth. Light reflected from selected areas of a prosthesis or tooth is diffracted into its color spectrum and the intensity of each of any number of the component colors in the spectrum is discretely measured by electronic measuring apparatus and recorded for later comparison or matching. The reflected light color spectrum can also be continuously swept by the electronic measuring apparatus to provide an output waveform whose shape is characteristic of the color shading of the area of the tooth or prosthesis under examination.

5 Claims, 3 Drawing Figures

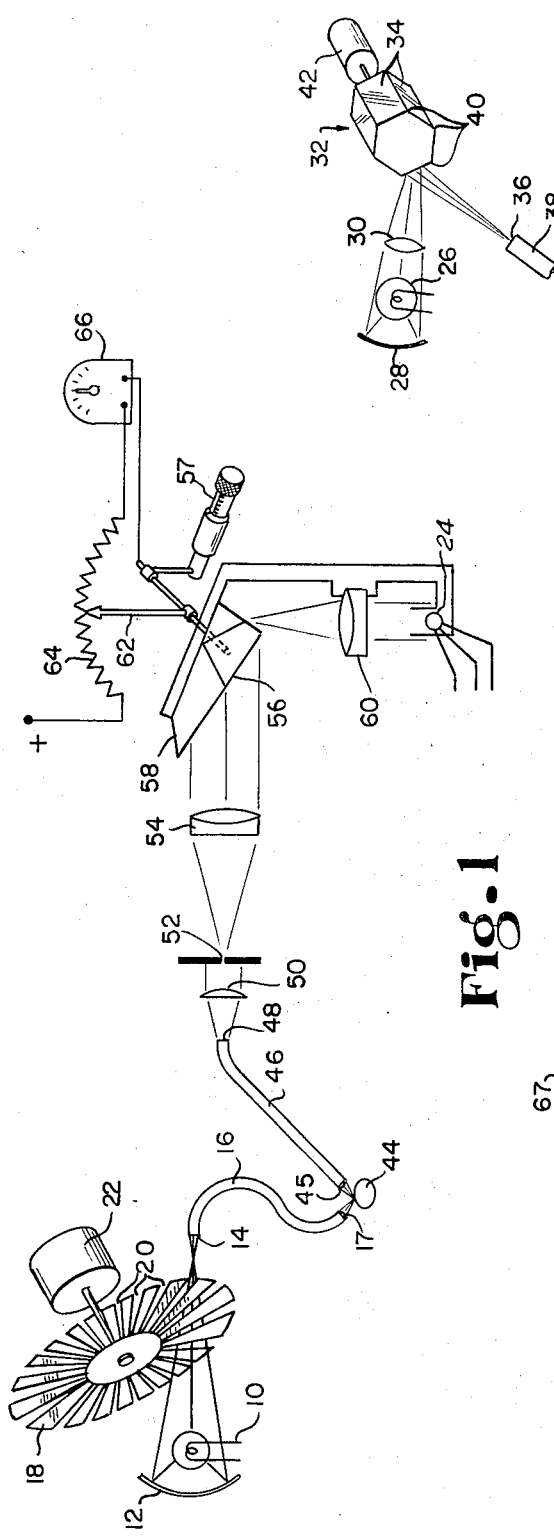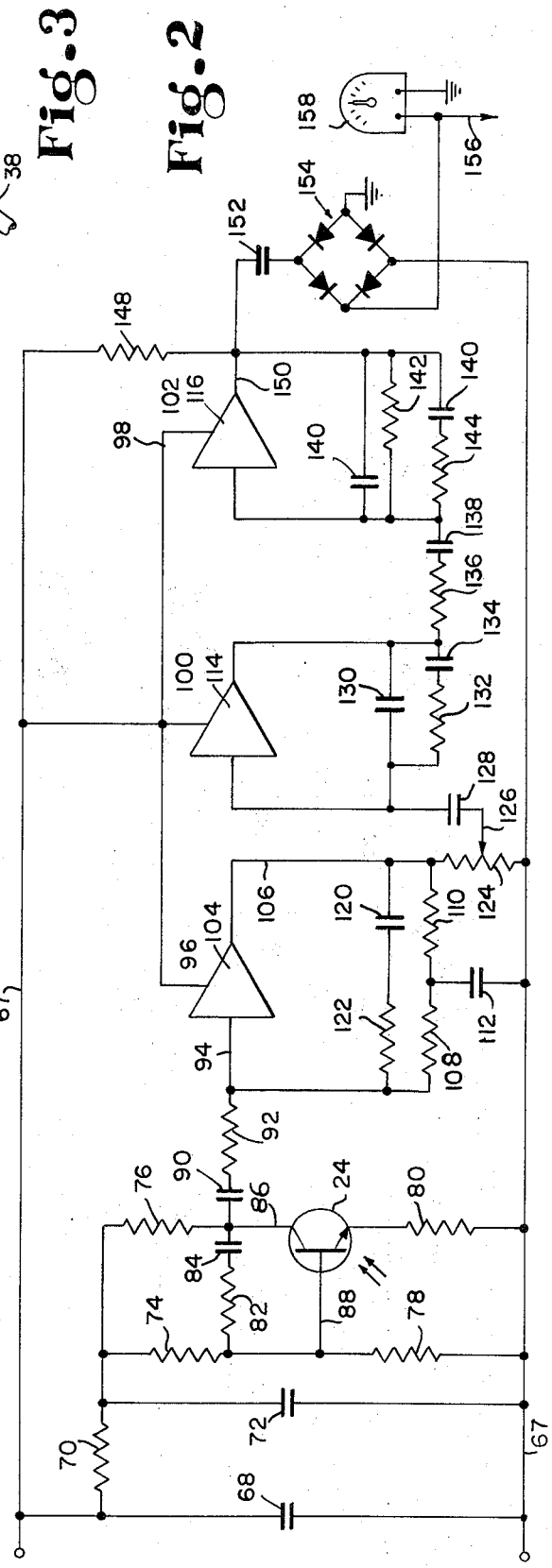

COLOR SHADE ANALYZER

BACKGROUND OF THE INVENTION

This invention relates to apparatus for the color spectrum analysis of the light reflected from an object such as a tooth or the like.

The color shading of a fixed or removable dental prosthesis must be closely matched to the color or shade of the natural teeth which a patient has. A natural tooth is composed of a dense material called dentine which is enclosed by the less dense and protective enamel. The dentine is darker in color than the enamel so that a darkening of the tooth color is effected by its presence. However, the dentine tapers off in the vicinity of the biting edge of the tooth which is thereby primarily composed of enamel and appears much lighter in color. An acceptable color matching depends on the successful matching and synthesis of this variance in color over the length of a tooth.

Conventionally, a dentist or dental technician attempts to visually match the color of the natural teeth with standard colors on a chart. A prosthesis having the requisite color shading to correspond to the standard colors which were selected is then fabricated in a laboratory. Only when the replacement is actually placed in the mouth of the patient will the dentist know with certainty that the chosen colors were correct. The color selections performed in this manner are more often than not unsuccessful. The reworking necessitated by a mismatch is expensive and time consuming for the laboratory and dentist and particularly discouraging for the patient.

The present invention overcomes the disadvantages inherent in the prior art methods by providing an apparatus whereby the color of a natural tooth can be analytically and quantitatively measured at various areas over its length and the results used as a standard value to which the color of the dental prosthesis is equated while it is still in the laboratory. Furthermore, the inventive apparatus permits the exact shading of the natural tooth to be matched consistently without the errors induced by human vision variables.

SUMMARY OF THE INVENTION

In accordance with one form of the invention, we provide an apparatus which illuminates an object such as a natural tooth or the like, and processes the light reflected from a specified area of the object to determine the intensity of its various chromatic components. The relative component intensities are recorded as indicative of the composite color of that area being analyzed.

In a preferred embodiment of the invention, an incandescent beam of light is focused on one end of a transmitting fiber optic bundle which carries and focuses the light onto a small area of the object whose color is to be quantitatively ascertained. The light reflected from the object is received by a second fiber optic bundle and focused through a condenser lens and a shaping aperture onto an achromatic lens. The resulting parallel rays of light are then forced on a prism which diffracts them into their spectral or chromatic components. The relationship of the receiving face of the prism to the incoming parallel light rays is adjustably altered to focus selected portions of the spectral band contained in the reflected rays onto a light sensitive semiconductor which generates a voltage proportional to the intensity of the particular portion of the spectrum focused upon it.

Desirably, the light spectrum is divided into at least ten parts, each of which is individually focused on the semiconductor by the prism. The voltage generated by the semiconductor for each of the ten spectrum parts is highly amplified before application to a signal level recording means such as a printer or strip recorder. The resulting set of recorded voltage amplitudes characterizes the color and shading of the area of the object under analysis. Preferably, the prism position corresponding to each of these voltage amplitudes is also recorded so that the examination process can be exactly duplicated at a later point in time.

Alternatively, the receiving face of the prism can be continuously swept through its possible arcuate swing to obtain a continuous output wave form. In this instance, the shape of the waveform characterizes the color of the object under analysis. This technique would be advantageous when an oscilloscope or an X-Y plotter are used as the output device.

The initial illuminating light reaching the illuminating fiber optic bundle can be interrupted at a high frequency by a rapidly rotating chopper disk, a polygonally shaped structure with mirrored surfaces, or the like, to allow the use of an A.C. amplifier for amplifying the light sensitive semiconductor output. The instability and drift problems inherent with a D.C. amplifier would be thereby eliminated. The A.C. amplifier can also be made insensitive to the ambient light falling on the object by limiting, through a filter, the input signal frequency of the amplifier to that of the frequency at which the illuminating light is interrupted by the chopper disk.

The present invention has been found to be very beneficial in the matching of the color shading of a dental prosthesis with the natural tooth color of a patient. In this particular use, a set of component color intensity readings is taken in the manner described above at each of preferably three displaced areas of a natural and healthy tooth. The three sets of readings are used during the subsequent prosthesis fabrication to achieve the correct color and shading of the prosthesis by comparing similar readings taken from the prosthesis with the readings taken from the natural tooth. Any error may be corrected in the laboratory with comparative ease and without patient discomfort.

BRIEF DESCRIPTION OF THE DRAWINGS

The accompanying drawings illustrate the invention and, by way of example, show a preferred embodiment. In such drawings:

FIG. 1 is a diagrammatic showing of the optical portion of the invention;

FIG. 2 is a circuit diagram of the electrical measuring and output portion of the invention; and FIG. 3 is a diagrammatic showing of an alternative apparatus for interrupting the illuminating light.

DETAILED DESCRIPTION OF THE PREFERRED EMBODIMENT

The preferred form of the invention shown in FIGS. 1 and 2 has particular advantages in the color shade matching of a dental prosthesis with the natural teeth of a patient. In general, a fiber optic bundle is used to transmit an on and off pulsing light to a small area of a tooth or prosthesis which is positioned in close proximity to the transmitting end of the bundle. A second fiber optic bundle, also held in close relationship with the tooth, transmits the light pulses reflected therefrom to a lens system for shaping before they are passed through a diffracting prism. The angular relationship of the prism to the incoming light pulses is adjustable so that any particular chromatic component of the color spectrum in the reflected light can be directed onto a light sensitive semiconductor, i.e., a photo transistor. The electrical output signal of the semiconductor has a frequency equal to that of the original pulsing light, and an amplitude indicative of the intensity of the particular chromatic component focused upon it by the prism. This electrical signal is amplified by a plurality of AC amplifier stages and the subsequent output signal rectified whereby the amplitude of the resulting D.C. signal can be used to drive various output devices for recording the relative intensity of the chromatic component under consideration. The receiving angle of the prism is then successively and discretely altered to yield a series of intensity readings which, when associated with corresponding wave length readings representing the chromatic components analyzed, characterize and define the color shading of the tooth area under consideration. Preferably, three sets of readings are obtained in this manner from different areas of the tooth so that any difference in shading over its length can be ascertained and recorded. The color of the prosthesis material may then be color analyzed in the same manner to tell exactly, while still in the fabrication laboratory, if the color of the natural teeth and the prosthesis match.

More specifically, and with reference to FIG. 1, an incandescent light bulb 10 supplies the light source for the device. The light from the bulb 10 is focused, with the aid of a reflector 12, on the receiving end 14 of a bundle of fiber optic filaments 16. A circular and radially slotted chopper disk 18 is positioned between the bulb 10 and reflector 12 and the receiving end 14 of the fiber optic filaments 16 for periodically interrupting the light rays to create a pulse train of light pulses. The frequency at which the pulses are created, preferably on the order of 1,200 Hz, is determined by the number of slots 20 in the disk 18 and the speed at which it is rotated by a synchronous motor 22. The use of a pulsed light source instead of steady state illumination permits the utilization of AC amplifiers for amplifying the electrical signal generated by the photo transistor 24, as will be described below, to minimize the instability and drift problems which would occur with D.C. amplification. Furthermore, the relatively high frequency chopping of the illuminating light, together with the coupling capacitor 90 between the photo transistor 24 and the A.C. amplifiers, makes the system insensitive to the 120 Hertz flicker frequency generally found in ambient fluorescent lighting fixtures, and the like, so that the light intensity readings obtained will not contain components resulting from the ambient lighting and will thereby be impervious to changes in the intensity of the ambient lighting where the readings are taken.

Alternatively, an illuminating pulse train of light can be created by the apparatus shown in FIG. 3. The light from an incandescent light 26 is focused by a reflector 28 and a lens 30 on the mirror surfaces 32 of a rotating chopper 34 having an octagonal cross section, and therefrom to the receiving end 36 of a fiber optic bundle 38. The light is interrupted in this instance by the passing of the edges 40 of the chopper through the incoming beam of light. Rotation is again provided by a synchronous motor 42.

The transmitting end 17 of the fiber optic bundle 16 is held in close proximity to and focuses the illuminating pulse train of light upon a small area of the tooth 44 or other object which is to have its color analyzed. The light pulses which are reflected from the surface of the tooth 44 contain the color spectrum indicative of the color of the tooth 44. These reflected pulses are received by the receiving end 45 of a second fiber optic bundle 46 whose transmitting end 48 is in communication with a condenser lens 50.

The condenser lens 50 focuses the light rays in each pulse through a shaping aperture 52 to obtain a narrow beam of light from each pulse. The narrowed beams of light thereafter pass through an achromatic lens 54 and are aligned in parallel before falling onto the receiving surface 56 of a constant deviation prism 58. The constant deviation prism 58 is employed so that the focal length for each wave length of diffracted light will be the same, thereby yielding clear and distinct divisions within the resulting color spectrum.

A second achromatic lens 60 focuses the diffracted light emitted by the prism 58 onto the light sensitive area of the photo transistor 24. The particular wave length or portion of the color spectrum which the photo transistor 24 receives is a function of the angular position of the prism receiving face 56 with respect to the incoming parallel light rays. Preferably, the prism 58, the second achromatic lens 60 and the photocell 24 are operatively mounted to rotate as a unit whereby the angle formed by the incoming light rays from the first achromatic lens 54 and the receiving face 56 of the prism 58 can be adjustably altered to impinge selected portions of the color spectrum on the photocell 24. The positioning can be effected by a rotational micrometer 57 or a conventional stepping motor (not shown) which would rotate the prism assembly through fixed and precise arcuate movements.

The prism 58 is also mechanically fixed to the wiper arm 62 of a positional potentiometer 64 which is connected between a positive D.C. voltage supply B+ and ground. A D.C. meter 66 is connected between the wiper arm 62 and ground whereby the meter reading is indicative of the relative angular position of the prism 58. Transitively, the meter reading is also indicative of the wave length of light which is falling on the photo transistor 24 at any particular angular position of the prism 58.

The biasing and amplification circuitry for the photo transistor 24 is shown in FIG. 2. The photo cell transistor 24 is preferably coupled with a photo-Darlington amplifier in an integrated circuit which is symbolically represented as the photo transistor 24. Biasing potential for the photo transistor 24 is supplied from a C+ voltage supply through supply leads 67. A capacitor 68 is connected across the voltage supply leads 67 to electrically smooth the supply voltage C+. A resistor 70 and a capacitor 72 form a clamping circuit to further smooth the output signal from the C+ voltage supply.

The photo transistor 24 is biased to operate within its active operational region. This class A operational biasing is provided by four resistors 74, 76, 78 and 80. It has been found that signal feedback through the C+ voltage supply leads 67 causes the amplifier formed by the photo transistor 24 and biasing resistors to go unstable. The amount of feedback signal needed to cause instability of this type is extremely small due to the high current gain of the amplifier. A resistor 82 and capacitor 84 are connected in series between the collector 86 and the base 88 of the photo transistor 24 to decrease the current gain somewhat to stabilize the device.

The collector 86 is used as the output lead for the amplifier and is AC coupled by a capacitor 90 to one side of a load resistor 92. In addition to coupling, this capacitor 90 is responsible for excluding any photo transistor output caused by any ambient fluorescent light in the lab or examination room which is reflected from the tooth or prosthesis and picked up by the receiving fiber optic bundle 46. As previously indicated, any such photo transistor output would be at a so called flicker frequency of around 120 Hertz, while the frequency of any output resulting from the chopped light pulse train would be at least 1,200 Hertz. The increased impedance to the 120 Hertz output signal incurred by selecting a fairly small value of coupling capacitance 90 has been found sufficient to make the subsequent amplifier stages insensitive to this signal so that only the 1,200 Hertz signal will be usable.

The other side of the load resistor 92 is connected to the input lead 94 of the first stage 96 of a three-stage ultra high gain AC amplifier 98. The other amplifier stages 100 and 102 are connected in cascading relationship with the first stage 96.

The feedback circuit for the amplifier 104 in the first stage 96 is comprised of two parallel circuits connected between the input lead 94 and the output lead 106 of the amplifier 104. One of these parallel circuits is comprised of two serially connected resistors 108 and 110 which have their common connection coupled through a capacitor 112 to ground. These two resistors 108 and 110 and capacitor 112 bias the first stage amplifier 104 in its active operating region when C+ voltage is applied to the amplifier through the power supply leads 67.

The second branch in the feedback circuit for the first amplifier 104 is made up of a serially connected capacitor 120 and resistor 122 and is used to substantially reduce the gain of the amplifier 104 when presented with signals having frequencies in excess of the frequency of the chopped light pulse train. The high frequency signals thereby eliminated represent any electrical noise which has been induced in the circuitry. It is important that these noise signals be eliminated at the first stage before the extremely high gain amplification performed by the second and third stages 100 and 102 make the results from a noise created signal and from a color created signal indistinguishable.

The output conductor 106 of the first stage amplifier 104 is connected to ground through an adjustable potentiometer 124. The input to the second stage amplifier 114 is taken from the wiper arm 126 of this grounded potentiometer which is coupled to the amplifier 114 through a coupling capacitor 128. The potentiometer 124 provides a gain adjustment for the second stage amplifier 114.

The controlling feedback network for the amplifier 114 in the second stage 100 consists of a stabilizing capacitor 130 connected in parallel with a serially connected resistor 132 and capacitor 134 which reduces the high frequency gain of the amplifier stage to help minimize the amplification of any high frequency noise induced in the second stage 100. The output of the second amplifier stage 100 is coupled to the third stage 102 through a gain limiting combination of a resistor 136 and a capacitor 138.

The amplifier 116 in the last stage 102 also has a feedback circuit to stabilize and reduce the noise signal content of its output which includes the parallel combination of a capacitor 140, a resistor 142 and a resistor 144 and capacitor 146 connected in series.

The output signal of the last stage 116 is impressed across a load resistor 148 which is connected between the output lead 150 of the amplifier 116 and the C+ power supply lead 67. This signal, still at the chopped light frequency, passes through a coupling capacitor 152 and is rectified by a full wave diode bridge rectifier 154, whereby the amplitude of the resulting D.C. output signal is representative of the intensity of the particular color of light focused on the receiving surface of the photo transistor 24 and can be read on a D.C. voltmeter 158 connected between the rectifier bridge output conductor 156 and ground.

As previously mentioned, the invention is preferably used as the precise means by which the color shade of a dental prosthesis may be successfully matched with that of the natural teeth of a patient. In operation, the illuminating and receiving fiber optics bundles 16 and 46 are held in close proximity to a particular and small area of a natural tooth located adjacent the space where a prosthesis is to be inserted. The arcuate position of the mechanically connected prism 58, achromatic lens transistor and photo ransistor 24 is adjustably and appropriately altered, as by the micrometer 57, to focus the first desired chromatic component of tooth reflected light on the photo transistor 24 as indicated by the correct reading on the prism position meter 66. The resulting reading on the output voltmeter 158 is manually recorded along with the reading on the prism position meter 66. The arcuate position of the prism is then carefully adjusted to focus the second desired chromatic component of tooth reflected light on the photo transistor 24 as again indicated by its positional meter 66 and the second pair of readings are then recorded. Successive pairs of readings are recorded in this way until a sufficient number of chromatic components of the tooth reflected light have been analyzed to characterize that area of the tooth. Preferably, a set of ten such readings is compiled at three areas of the tooth, e.g., one next to the supporting gum, one intermediate the length of the tooth, and one at the biting edge.

The three sets of color shade readings are thereafter compared with a group of three sets of readings taken in the same manner as described but with the prosthesis as the object. This comparison can take place in the lab and is a true indication of how closely the prosthesis and natural tooth match. Any incongruity ascertained between them and the particular chromatic component or components at which this incongruity exists can then serve as a basis for changing the color or shading of the prosthesis.

While the readings obtained from the prism positional meter 66 and the color intensity output meter 158 have been found to yield very satisfactory results in the color shade matching of a natural tooth with a dental prosthesis, other output devices can be used, if desired, to give equally satisfactory results. For example, the prism, lens and photo transistor assembly can be swept through its arcuate movement instead of being discretely stepped through. In this case, the wiper arm 62 of the positional potentiometer 64 could be electrically coupled as an input to one axis of an X-Y plotter and the intensity output conductor 156 could be coupled as an input to the remaining axis. The resulting plot would be a continuous waveform showing the relative intensity of all the chromatic components in the light reflected from the tooth, or prosthesis.

While the pre embodiment of our invention has been described with reference to the color analyzation of a tooth and prosthesis, it should be clearly understood that this description has been made only by way of example and not as a limitation to the scope of the invention.

We claim:

1. An apparatus for analyzing the color of an object, which comprises an incandescent light source; means for periodically interrupting the light from said light source at a predetermined frequency; means in communication with said light source for focusing light from said source onto the object and means for receiving light reflected therefrom; means in communication with said receiving means for diffracting the reflected light into its color spectrum and adjustably focusing a portion of that spectrum on a photo sensitive semiconductor, whereby a signal proportional to the intensity of said spectrum portion is generated by said photo sensitive semiconductor, filtering means coupled to said semiconductor for substantially impeding any signal from said semiconductor not at said predetermined frequency; amplifying means coupled to said filtering means; and output means coupled to said amplifying means for indicating the magnitude of said generated signal.

2. The apparatus as claimed in claim 1 wherein said means for focusing light from said source includes a first fiber optic bundle; and said means for receiving reflected light includes a second fiber optic bundle.

3. The apparatus as claimed in claim 1 wherein said photo sensitive semiconductor includes a photo transistor.

4. An apparatus for analyzing the color of an object, which comprises, an incandescent light source; light interrupting means for periodically interrupting the light from said incandescent light source at a predetermined frequency; a first fiber optic bundle in communication with said light source for focusing light from said source onto the object to illuminate the surface of the object; a prism having a receiving face; a second fiber optic bundle in communication with the illuminated surface of the object for receiving and transmitting light reflected therefrom and for focusing said reflected light on said receiving face of said prism; said prism being for diffracting said reflected light into its color spectrum; variable voltage means coupled to said prism for providing voltages indicative of the position of said prism receiving face; a photo sensitive semiconductor in communication with said prism; positioning means connected to said prism for successively effecting changes in the position of said prism receiving face for focusing preselected portions of said color spectrum on said photo sensitive semiconductor, whereby successive signals are generated by said photo sensitive semiconductor proportional to the intensities of said preselected portions of said color spectrum; filtering means coupled to said semiconductor for sustantially impeding any signal from said semiconductor not at said predetermined frequency; and output means including amplifying means coupled to said filtering means for amplifying and presenting said successive signals.

5. The apparatus of claim 4 wherein said photo sensitive semiconductor includes a photo transistor.

* * * * *